us007334626B2

United States Patent
Hopwood et al.

(10) Patent No.: US 7,334,626 B2
(45) Date of Patent: Feb. 26, 2008

(54) APPARATUS FOR CONNECTING A BATTERY PLATE TO A METAL STRAP OR POST

(75) Inventors: Robert Hopwood, Somerset (GB); Christopher Barge, Bristol (GB)

(73) Assignee: TBS Engineering Limited, Cheltenham (GB)

( * ) Notice: Subject to any disclaimer, the term of this patent is extended or adjusted under 35 U.S.C. 154(b) by 0 days.

(21) Appl. No.: 10/543,774

(22) PCT Filed: Dec. 19, 2003

(86) PCT No.: PCT/GB03/05562

§ 371 (c)(1), (2), (4) Date: May 24, 2006

(87) PCT Pub. No.: WO2004/067208

PCT Pub. Date: Aug. 12, 2004

(65) Prior Publication Data

US 2006/0272793 A1    Dec. 7, 2006

(30) Foreign Application Priority Data

Jan. 31, 2003  (GB)  ................... 0302268.8

(51) Int. Cl.
B22D 35/00 (2006.01)
B22D 37/00 (2006.01)

(52) U.S. Cl. .................. 164/337; 164/133; 164/135
(58) Field of Classification Search ........ 164/133–136, 164/337
See application file for complete search history.

(56) References Cited

U.S. PATENT DOCUMENTS 3,200,450 A    8/1965  Buttke
3,565,162 A    2/1971  Farmer
4,241,780 A    12/1980 Eberle
7,082,985 B2 * 8/2006  Hopwood ................ 164/335

FOREIGN PATENT DOCUMENTS

WO    WO 94/16466    7/1994

* cited by examiner

*Primary Examiner*—Kuang Lin
(74) *Attorney, Agent, or Firm*—Young & Thompson

(57) ABSTRACT

This invention relates to apparatus for connecting a battery plate to a metal strap or post or to moulds therefore. In contrast to existing arrangements lead is fed to the feed passage (17) via an opening (20) which is positioned immediate the ends of the aligned cavities in the set (14) of the mould. This arrangement enables the cavities to be fed with lead at approximately the same time and hence the dip of the lugs into the cavities can be optimised without any significant difficulties. In itself this substantially increases productivity. It has also been found that up to three batteries can be cast simultaneously, particularly if bypasses (16c) are used for fine tuning the lead supply.

18 Claims, 4 Drawing Sheets

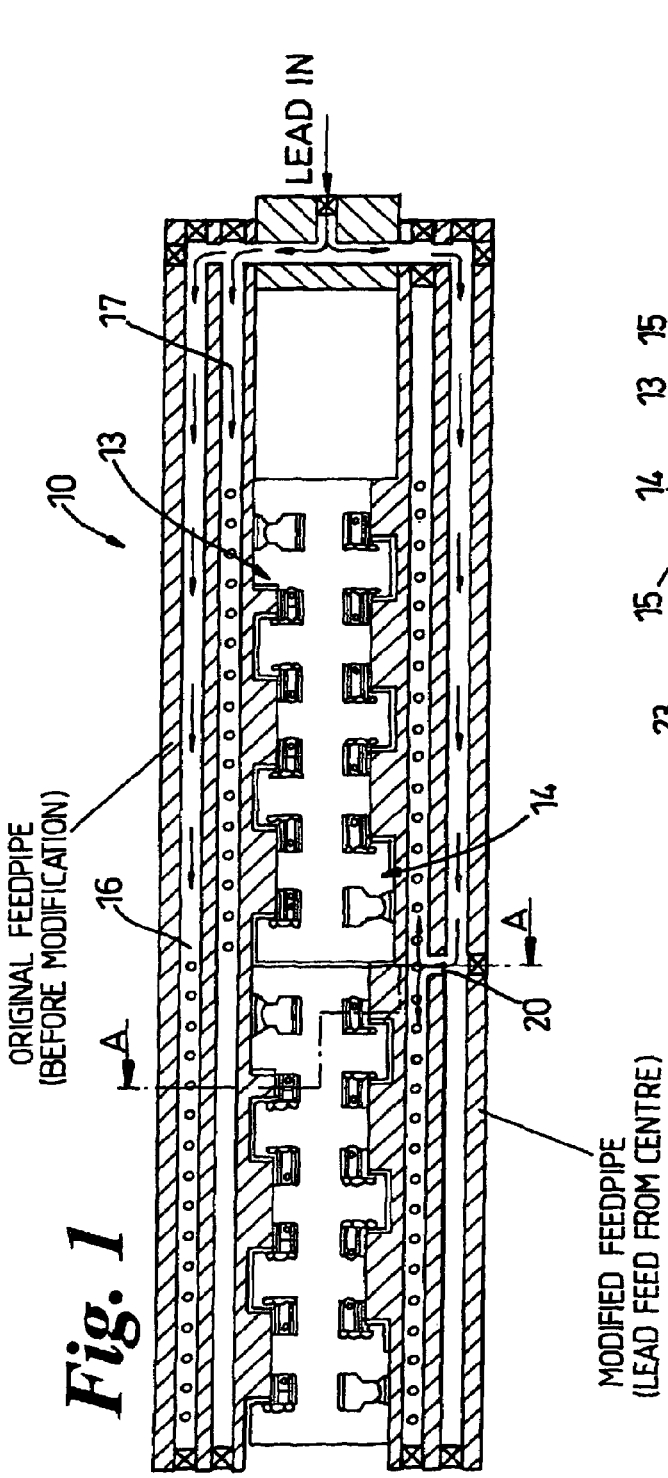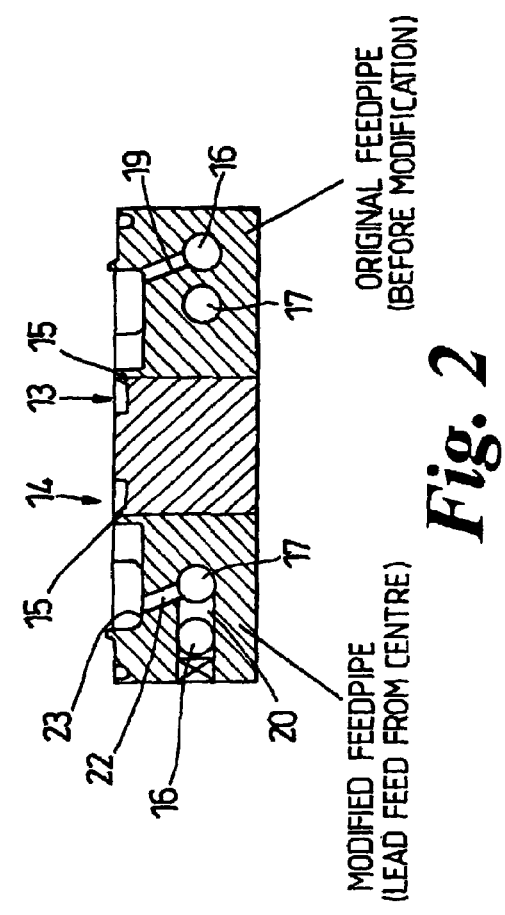

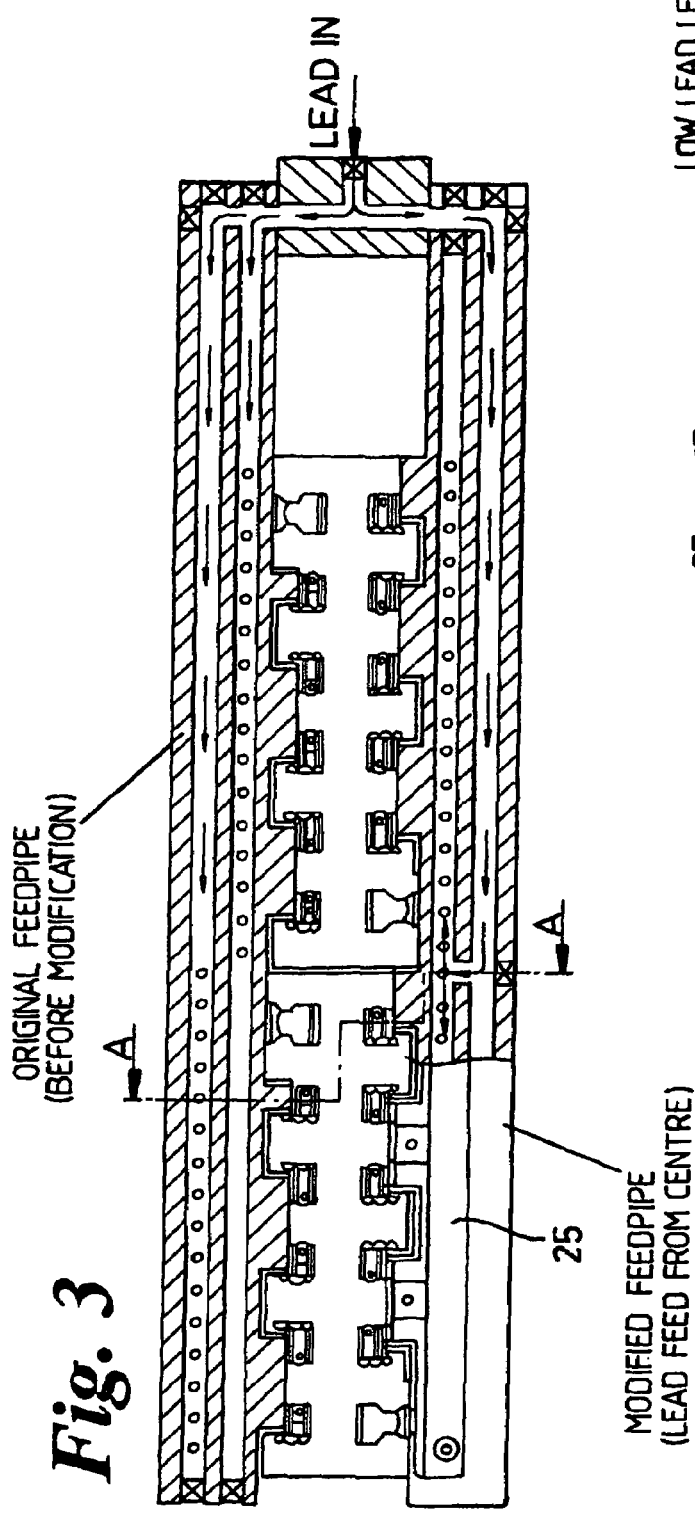

APPARATUS FOR CONNECTING A BATTERY PLATE TO A METAL STRAP OR POST

FIELD OF THE INVENTION

This invention relates to apparatus for connecting a battery plate to a metal strap or post or to moulds therefore.

BACKGROUND OF THE INVENTION

The term "battery" is used herein to include accumulators. In a conventional lead acid battery it is customary to connect together the plates of each stack by means of a lead strap or post which is fixed to aligned lugs or tabs on the plate. As is explained in detail in WO 94/16466, the disclosure of which is incorporated herein, with bigger moulds problems can arise in flowing sufficient lead into the cavities in the moulds and the solution postulated in that case was to have a pair of these passages for a set of cavities so that one half of the set was fed from one of the feed passages, whilst another half of the set was fed from the other. As is discussed in WO 94/16466, this approach had many advantages and the mould has been extremely successful.

However, problems have arisen in getting consistent post or strap quality, because, as the applicants have now appreciated, that part of the set which lies nearest the pump can be filled up to half a second earlier than the second set of cavities, fed by the other passage, which are more remote from the pump. As the lugs can only be dipped at a single instant it is very difficult to optimise the moment of dipping in relation to cavity fill and this can affect not only the final shape of strap or post moulded, but also on the quality, because the thermal exchange that takes place on dipping will vary in dependence on the amount of lead in the mould.

Attempts have been made to solve this problem by very accurate automisation of the system, but the applicants have now realised that surprisingly a much cheaper and simpler solution can be adopted.

SUMMARY OF THE INVENTION

Thus from one aspect the invention consists in apparatus for connecting a battery plate to a metal strap or post, including a mould having an aligned set of posts or strap cavities, a molten metal feed duct for feeding all the cavities in the set and extending adjacent thereto, a weir or weirs between the feed duct and the cavities, a feed passage extending below the feed duct for distributing molten lead to the duct and having a lead inlet characterised in that the lead inlet location is intermediate the ends of the set.

By feeding the lead intermediate the ends, the time lag between filling is at once is reduced and by proper positioning of the location the mould can be arranged such that those cavities to one side of the location are filled in equal time with those on the other side. Thus in a preferred embodiment the location is positioned such that the cavities on either side of the location are filled in at least approximately equal time.

In most arrangements, where the cavities are symmetrical about a centre line, this will be achieved with a location which is at least approximately equidistant, measured along the duct, from the ends of the set. However, if the cavities are not of equal capacity or the cross-section of the duct on one side of the location is different to the cross-section of the duct on the other side of the location some other position for the location may be preferred.

It will be understood, as indicated above, that simply by feeding intermediate the ends, a degree of improvement in terms of filling time can be achieved over a feed duct which is fed solely from one end.

In general the feed passage may extend generally below the duct and may be connected to the duct by at least one passage up which the lead can well.

The passage may allow drain back of the lead to complete a cycle and the mould may further include at least one body disposed in the feed duct so as to reduce the volume of that part of the feed duct which lies between the lowest and highest level marks in the duct for lead in a cycle.

The invention also includes a mould for use in apparatus for connecting battery plate to a metal strap or post having the features set out above.

From another aspect the invention includes a mould for apparatus for connecting a battery plate to a metal strap or post, the mould including an aligned set of post or strap cavities, a molten metal feed duct for feeding all the cavities in the set and extending adjacent thereto, a weir between the feed duct and the cavities, a feed passage extending below the feed duct for supplying molten lead to the duct and for allowing drain back of the lead characterised in that there is at least one body disposed in the feed duct so as to reduce the volume of the part of the feed duct, which lies between the lowest and highest level marks in the duct for lead in a cycle.

From a further aspect the invention consists in a mould for connecting metal strap or posts to respective battery plates for a plurality of batteries, the mould included aligned sets of post or strap cavities for each battery, a molten metal feed duct for feeding all the cavities, a lead feed for feeding lead to the feed duct and means for adjusting localised feed into the duct to obtain uniform cavity filling along the extent of the mould.

In any of the above cases bypass feeds may be provided along the feed duct for selectively providing localised lead flow.

Although the invention has been defined as above, it is to be understood it includes any inventive combination of the features set out above or in the following description.

BRIEF DESCRIPTION OF THE DRAWING

The invention may be performed in various ways and a specific embodiment will now be described, by way of example, with reference to the accompanying drawings, in which, FIG. 1 is a horizontal section through a mould, with the upper part of the mould showing the arrangement described in WO 94/16466, whilst the lower half of the drawing illustrates an embodiment of the invention;

FIG. 2 is a section along the line A-A in FIG. 1;

FIGS. 3 and 4 correspond to FIGS. 1 and 2 but include an optional displacement bar;

DETAILED DESCRIPTION OF THE INVENTION

Figure 5:
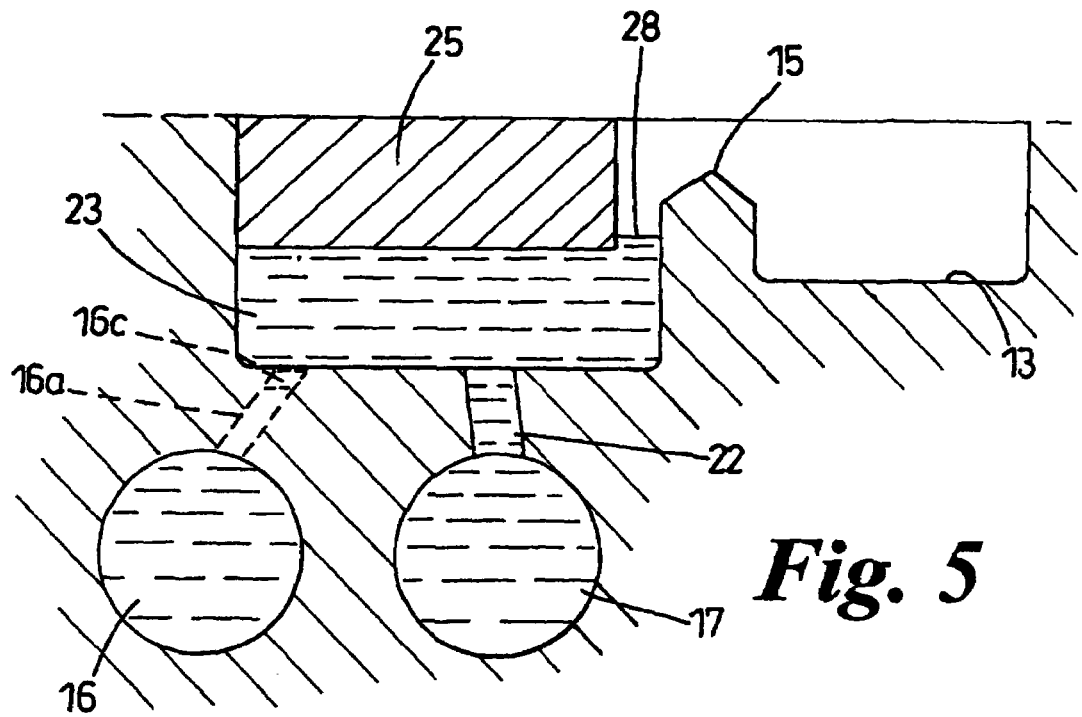
FIG. 5 is a schematic cross-section through one cavity set showing the lead low level.

A mould is generally indicated at 10 and includes sets of mould cavities 13, 14 which can be fed with lead, as described below, by weirs, some of which are indicated at 15. The basic construction and operation of these features is identical to that described in British Patent No. 2023471B and the description of that patent is incorporated into the specification for these purpose.

In the top half (the WO 94/16466) arrangement a pair of the passages 16, 17 are fed with a source of lead indicated to feed respective halves of the set of moulds 13 by means of vertical passages such as indicated at 19. As has been explained above this can lead to a time lag between the filling of the cavities supplied by passage 16 as compared with those supplied by passage 17.

In contrast, as shown in the lower half of FIG. 1 and the left hand half of FIG. 2, the lead is fed from passage 16 to passage 17 via an opening 20 positioned intermediate the ends of the aligned cavities in the set 14. The lead is then fed both left and right to well up passages 22 into a duct 23, that feeds the cavities 14. As the location of opening 20 is central, the lead will feed into the left hand cavities 14 at approximately the same time, as it flows into the right hand cavities, with the result that the timing of the dip of the lugs into the cavities can be optimised without any significant difficulties.

It will be understood that this solution is particularly efficacious.

As is generally well known moulds of this type work on what is known as the tidal system whereby lead flows into the mould cavities 13, 14 to a point of overflowing, normally under the operation of a pump, and then the pump is switched off and the excess lead in the mould drains back over the weir 15 and, mainly under gravity, then flows back to low level or low tide mark in the feed duct, before starting the cycle again. It is known to vary the overall volume which may be taken by the lead by including balance blocks, such as is indicated as 25 in FIG. 3, in order to balance the volume which is being fed in conjunction with one set of cavities, with the volume that is being fed in relation to another set of cavities but these do not significantly impinge on the volume of lead which exists between the low tide marks and the high tide marks during the cycle. The Applicants have appreciated that if they could reduce this latter volume, then they could significantly reduce the cycle time, because there is less lead to be pumped and, even more significantly, from a time point of view, there is less lead to be drawn back.

Figure 6:
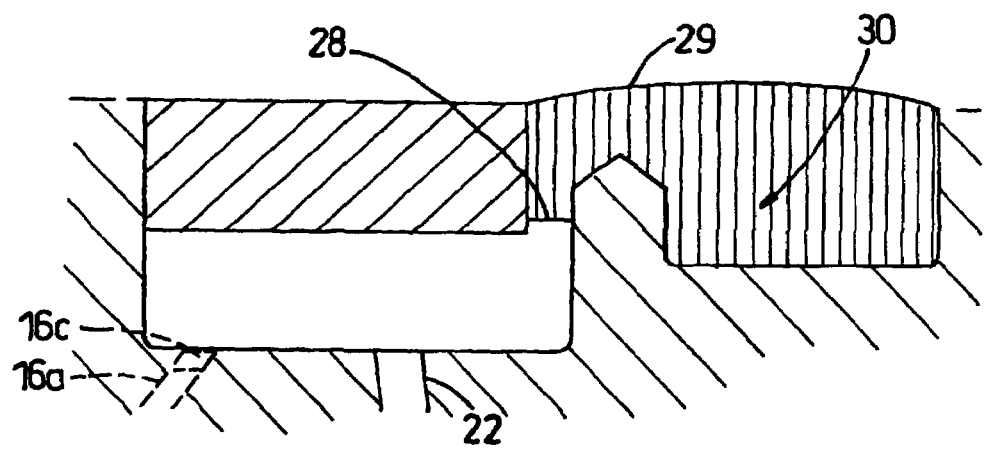
FIG. 6 is the corresponding view to FIG. 5 at the highest level lead mark.

They therefore propose to provide a displacement bar 25 which can be fitted to depend into the feed duct 23 to lie between the low level lead mark 28 and the high level lead mark 29. As can be seen in FIGS. 5 and 6 the bar 25 thus occupies much of the volume between the low level and high level marks leaving the hatched volume 30 shown in FIG. 6 as the amount which needs to flow back towards the feed pipes 16, 17 over the weir 15.

Although the FIG. 5 structure would normally work as shown in FIG. 4 with the feed pipe 16 feeding the feed pipe 17, as can be seen in FIG. 5, optional connections direct from the feed pipe 16 to the duct 23, such as is shown at 16a, can be provided to locally balance the flow into the duct 23 and hence into the locally adjacent moulds. Conveniently connections 16a are drilled along the length of the feed pipe 16 and then plugged as indicated in chain line 4 at 16c. When the mould is in situ a test run is carried out and the filling of the individual cavities is inspected. If there is incomplete filling of any cavity then one or more adjacent plugs 16c are removed to achieve the appropriate filling profile.

The Applicants have found that the ability to tune the localise flow lead, and in particular together with the enhanced lead flow achieved by the intermediate main feed mentioned above, enables them to fill simultaneously longitudinal aligned moulds for a plurality of batteries. This will hugely increase the productivity of any line incorporating the moulding apparatus.

Figure 7:
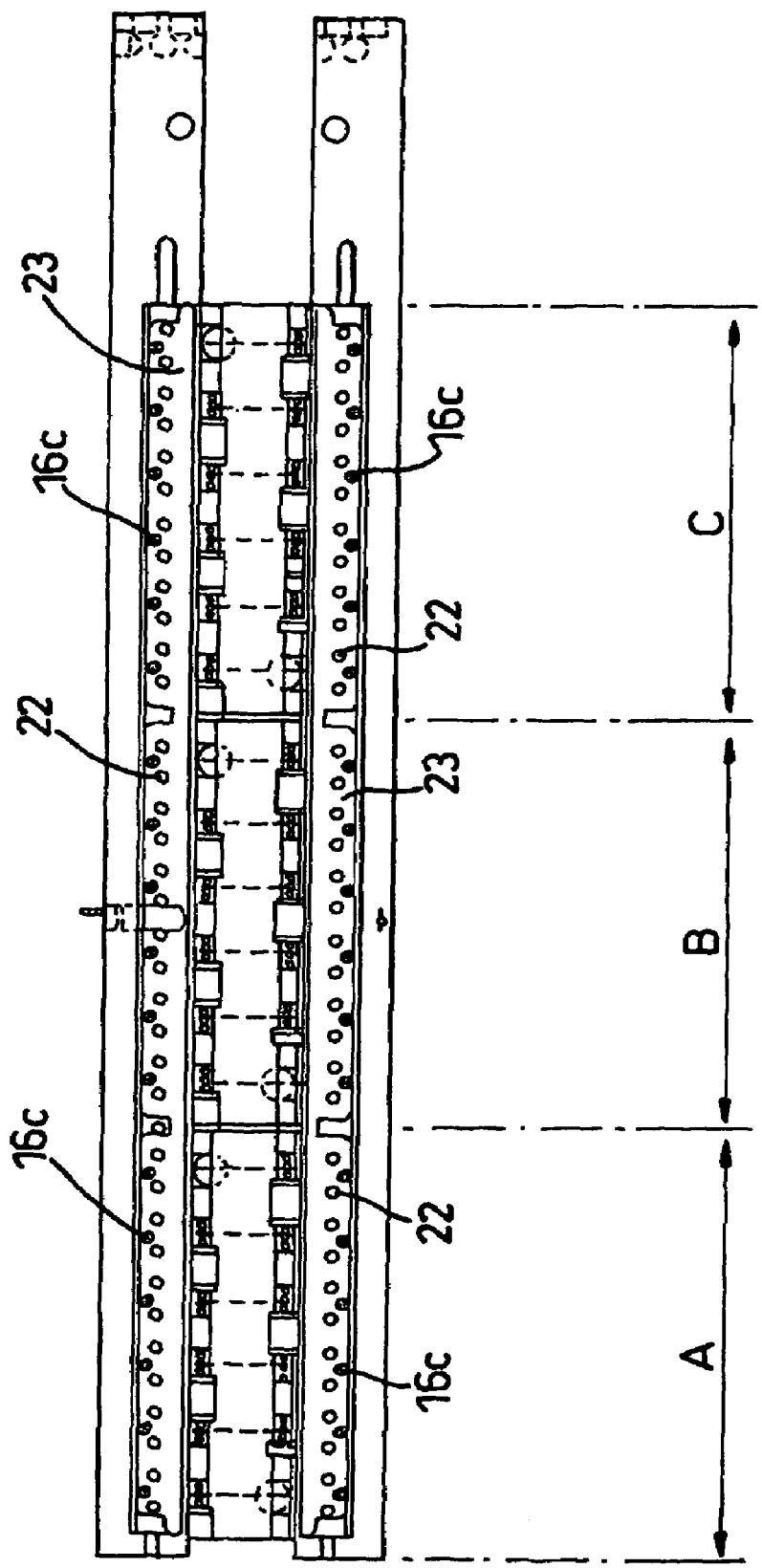
FIG. 7 is a plan view from above of a multiple battery mould incorporating the bypass feeds of FIGS. 5 and 6.

FIG. 7 illustrates a mould for moulding the straps and posts for three batteries as indicated as A, B and C.

The invention claimed is:

1. Apparatus for connecting a battery plate to a metal strap or post, including a mould having an aligned set of post or strap cavities, a molten metal feed duct for feeding all the cavities in the set and extending adjacent thereto, a weir between the feed duct and the cavities, a feed passage extending below the feed duct for distributing molten lead to the duct and having a lead inlet characterised in that the location of the lead inlet to the feed duct is intermediate the ends of the set.

2. Apparatus as claimed in claim 1 wherein the location is positioned such that the cavities on either side of the location are filled in at least approximately equal time.

3. Apparatus as claimed in claim 1 wherein the location is at least approximately equidistant, measured along the duct, from the ends of the set.

4. Apparatus as claimed in claim 1 wherein the feed passage extends generally below the duct and is connected to the duct by at least one passage up which lead can well.

5. Apparatus as claimed in claim 1 wherein the mould further includes at least one body disposed in the feed duct so as to reduce the volume of that part of the feed duct, which lies between the lowest and highest level marks in the duct for lead in a cycle.

6. Apparatus as claimed in claim 1 further including bypass feeds disposed along the feed duct for selectively providing additional localised lead flow.

7. Apparatus as claimed in claim 1 wherein the set includes cavities for battery plates for more than one battery.

8. Apparatus as claimed in claim 2 wherein the feed passage extends generally below the duct and is connected to the duct by at least one passage up which lead can well.

9. Apparatus as claimed in claim 3 wherein the feed passage extends generally below the duct and is connected to the duct by at least one passage up which lead can well.

10. Apparatus as claimed in claim 4 wherein the feed passage extends generally below the duct and is connected to the duct by at least one passage up which lead can well.

11. Apparatus as claimed in claim 2 wherein the mould further includes at least one body disposed in the feed duct so as to reduce the volume of that part of the feed duct, which lies between the lowest and highest level marks in the duct for lead in a cycle.

12. Apparatus as claimed in claim 3 wherein the mould further includes at least one body disposed in the feed duct so as to reduce the volume of that part of the feed duct, which lies between the lowest and highest level marks in the duct for lead in a cycle.

13. Apparatus as claimed in claim 4 wherein the mould further includes at least one body disposed in the feed duct so as to reduce the volume of that part of the feed duct, which lies between the lowest and highest level marks in the duct for lead in a cycle.

14. A mould for apparatus for connecting a battery plate to a metal strap or post, the mould including an aligned set of post or strap cavities, a molten metal feed duct for feeding all the cavities in the set and extending adjacent thereto, a weir between the feed duct and the cavities, a feed passage extending below the feed duct for distributing molten lead to the duct and having a lead inlet characterised in that the location of the lead inlet to the feed duct is intermediate the ends of the set.

15. A mould as claimed in claim 14 wherein the passage allows drain back of the lead and further including at least one body disposed in the feed duct so as to reduce the volume of that part of the feed duct, which lies between the lowest and highest level marks in the duct for lead in a cycle.

16. A mould as claimed in claim 14 including bypass feeds disposed along the feed duct for selectively providing additional localised lead flow.

17. A mould as claimed in claim 14 wherein the set includes cavities for battery plates for more than one battery.

18. A mould for connecting metal straps or posts to respective battery plates for a plurality of batteries, the mould included aligned sets of post or strap cavities for each battery, a molten metal feed duct for feeding all the cavities, a lead feed passage for feeding lead to the feed duct and means for adjusting localised feed into the duct to obtain uniform cavity filling along the extent of the mould.

* * * * *